Dec. 1, 1964  C. F. LUEDEMANN ETAL  3,159,166
ENGINE SAFETY CONTROL
Filed Oct. 16. 1961  2 Sheets-Sheet 1

INVENTOR.
Clarence F. Luedemann &
BY  Charles H. Smale
Paul Fitzpatrick
ATTORNEY INVENTOR.
Clarence F. Luedemann &
BY  Charles H. Smale
Paul Fitzpatrick
ATTORNEY

United States Patent Office 3,159,166
Patented Dec. 1, 1964

3,159,166
ENGINE SAFETY CONTROL
Clarence F. Luedemann and Charles H. Smale, Indianapolis, Ind., assignors to General Motors Corporation, Detroit, Mich., a corporation of Delaware
Filed Oct. 16, 1961, Ser. No. 145,268
8 Claims. (Cl. 137—31)

Our invention relates to improvements in safety controls for engines, and is particularly suitable for controls to shut down engines in the event of some casualty. As illustrated here, the invention is embodied in mechanism which responds to the breaking of a shaft of a gas turbine engine and immediately shuts off fuel to the engine.

As pointed out in U.S. Patent No. 2,930,189, in certain types of gas turbine engines, a turbine may run away and destroy the engine in a very short time after a shaft breakage which removes the load from the turbine. Such may be the case in a dual spool jet engine if the shaft connecting one turbine to the compressor driven by it parts. Also, in turbines the speed of which is limited by a load such as a governing propeller, breakage of the shaft connected to the propeller may result in destructive overspeed.

The patent referred to above discloses means responsive to breakage of a torque-transmitting shaft to move a member axially of the shaft and operate a fuel shut-off valve through a mechanical linkage. While the principal overall result of the operation of our safety control is the same, the means employed differ significantly and offer important advantages over those of the patent.

The nature of the invention and the advantages thereof will be apparent to those skilled in the art from the succeeding detailed description of the preferred embodiment thereof and the accompanying drawings.

Figure 1:
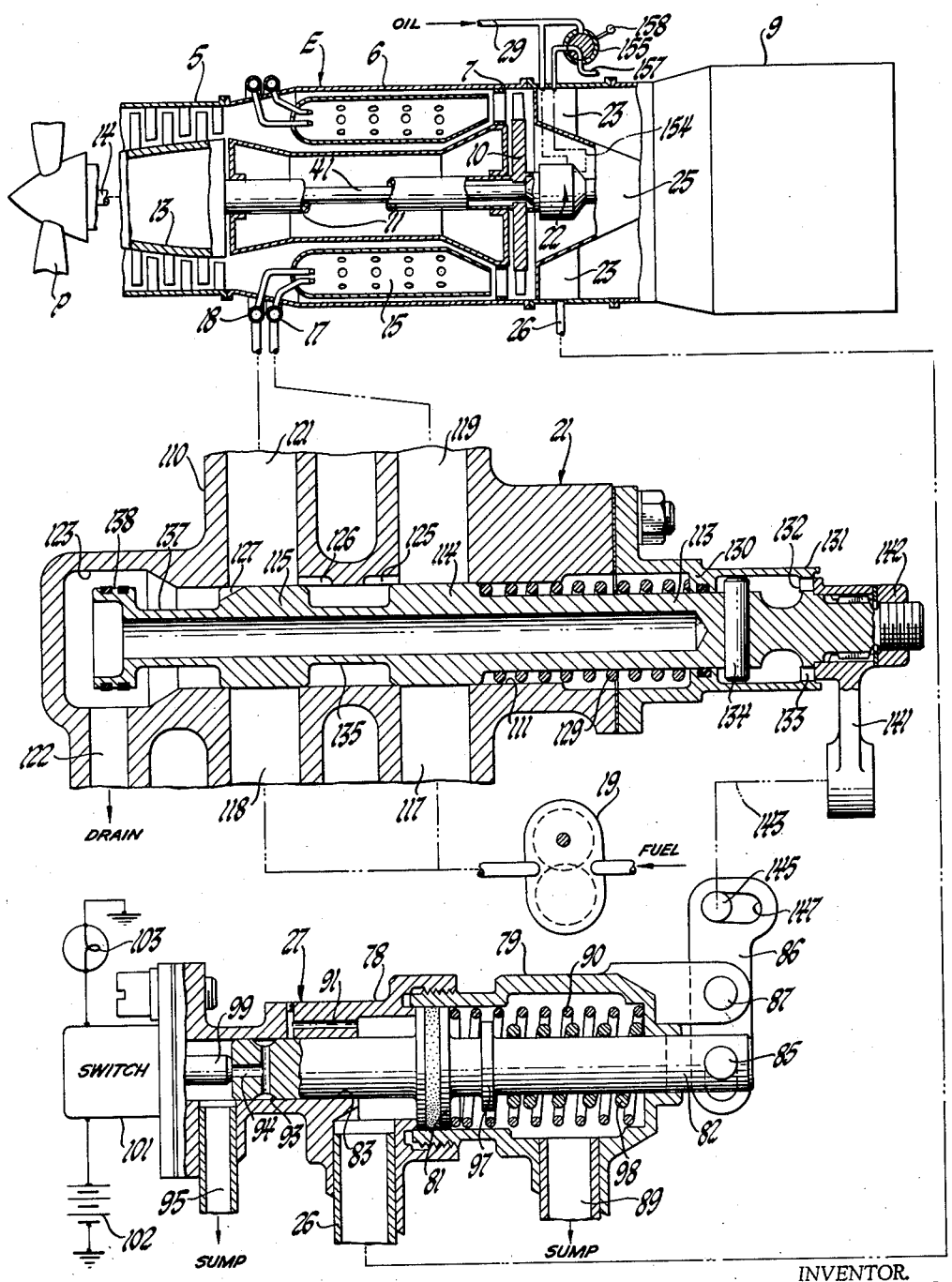
FIGURE 1 is a schematic drawing of the system illustrating the engine conventionally and showing certain parts of the control system in detail.

The invention is illustrated in FIGURE 1 as associated with a single spool turboprop engine E having a compressor 5, a combustion section 6, a turbine 7, and an exhaust duct 9. The turbine includes a rotor 10 driving a shaft 11 coupled to the rotor 13 of the compressor and, through a means not illustrated in detail, to shaft 14 which drives the propeller P. The combustion section 6 includes flame tubes 15 to which fuel is supplied by manifolds 17 and 18. The fuel is supplied in proper quantities under pressure from any suitable fuel pumping and metering system indicated schematically here simply by the pump 19, which may be driven by the engine. Fuel from the source 19 flows through a fuel shutoff and manifold drain valve 21 to the manifolds 17 and 18.

The rear end of the turbine shaft 11 is journaled in a housing 22 supported by struts 23 which also support the inner cone 25 of the exhaust duct. Means responsive to loss of the propeller driving shaft acts through mechanism to be described to transmit fluid pressure through a line 26 from the engine to an actuator or control device 27 which is mechanically coupled to the shutoff valve 21. The hydraulic system utilizes lubricating oil which is supplied under pressure from any suitable engine-driven or other pump (not shown) through a line 29.

Figure 2:
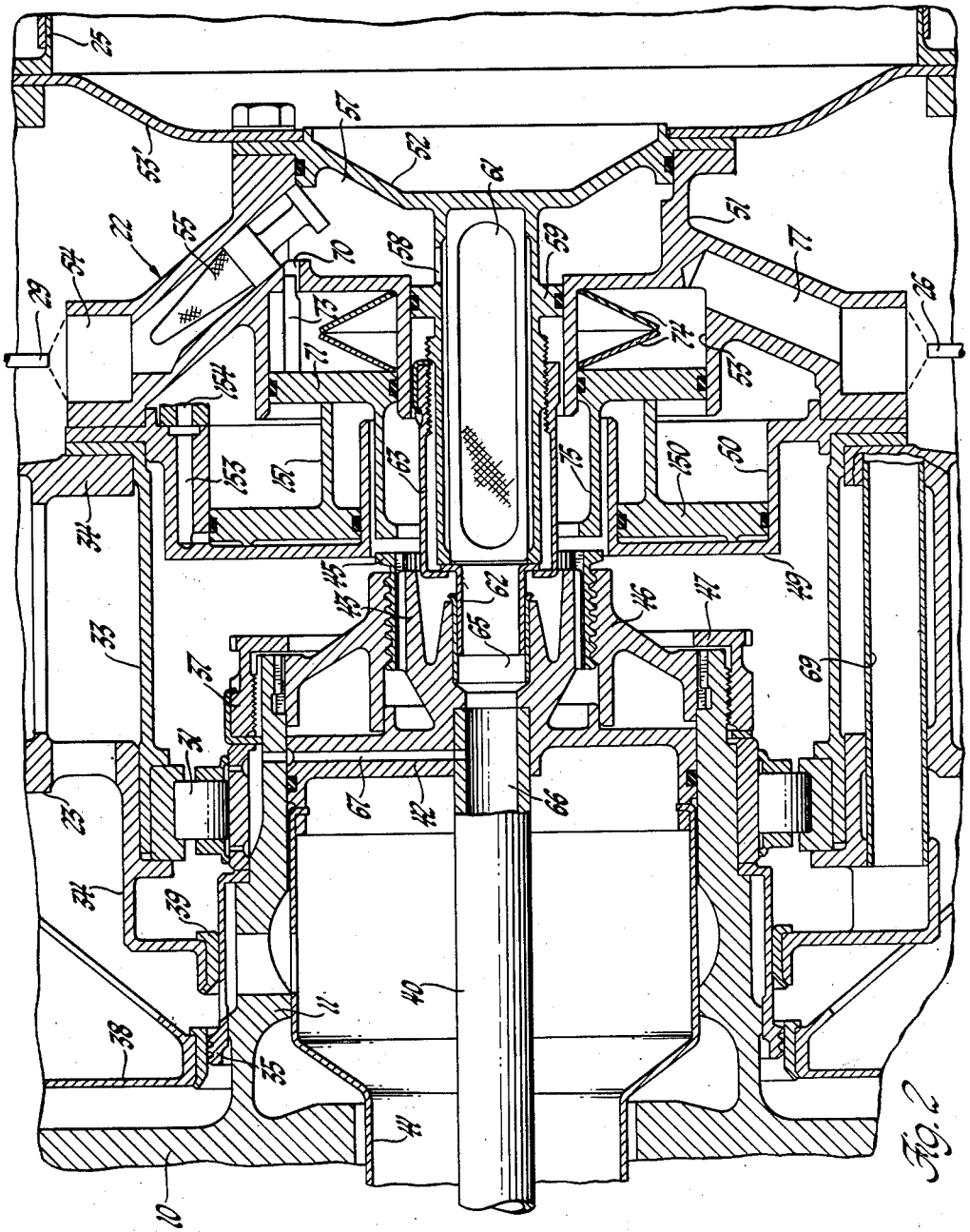
FIGURE 2 is a view of a portion of the engine taken in a plane containing the axis thereof.

Before further discussing the structure shown in FIGURE 1, it may be best to refer to FIGURE 2 for significant parts of the engine structure. FIGURE 2 illustrates the last or lowest pressure turbine wheel 10 and the rear portion of the turbine shaft 11 extending from the turbine into a roller bearing 31 which is supported in a cage 33 in housing 22. Cage 33 is mounted in a support ring 34 from which the struts 23 extend to the outer case of the engine. The assembly which defines the rear end of shaft 11 comprises a seal ring 35, the inner race of bearing 31, and a retaining nut 37. Seal ring 35 cooperates with a seal on the diaphragm 38 extending adjacent the rear turbine wheel and with a contact seal 39 mounted on the ring 34. An inner shaft 40 and a baffle 41 mounted within the turbine shaft 11 and connected to the propeller driving shaft terminate in a disk 42 mounted within the rear end of shaft 11. Disk 42 includes a splined stub shaft 43 on which is slidably mounted an internally splined sleeve 45. The exterior surface of sleeve 45 is threaded into a ring 46, the rim of which is splined into the end of shaft 11 and is retained by the inwardly projecting flange 47 of nut 37. The splines between ring 46 and the shaft are merely for assembly and not to provide for relative movement in operation. As will be apparent, however, if the turbine shaft 11 rotates relative to the inner shaft 40, the sleeve 45 will be rotated relative to ring 46, and the threads between these are so pitched that overrunning of the turbine such as would result from a shaft breakage screws sleeve 45 rearwardly. This provides the initial indication of shaft breakage.

Before proceeding to the remainder of the system which responds to this indication, certain details may be mentioned. A body 49 defining an annular rearwardly opening cylinder 50 and a second generally annular body 51 defining a forwardly opening annular pump cylinder 53 are fixed to the support 34 coaxial with the turbine shaft. A cover plate 52 and a supporting ring 53' for the inner exhaust cone 25 are bolted to the rear end of body 51.

The lubricating oil line 29 illustrated in FIGURE 1 connects to an inlet 54 from which it flows through a strainer 55 into a chamber 57 between the body 51 and cover 52. From chamber 57, the lubricating oil flows through a port 58 into a cylindrical filter housing 59 integral with the cover 52, which mounts an oil filter 61. The filter 61 is retained by a short oil transfer tube 62 held in place by the cup 63 threaded to the housing 59. The oil transfer tube 62 is piloted in a bore 65 in stub shaft 43 in which is fixed shaft 40 defining an oil tube 66 extending forwardly through the turbine. A branch passage 67 leading from this tube through the disk 42 and shaft 11 supplies lubricating oil to the bearing 31. Other bearings farther forward in the engine may be similarly lubricated from tube 66. Spent oil may be discharged through a scavenge oil line 69. The details of the lubricating system are not of particular moment to this invention, except that oil for operation of the safety system is most conveniently supplied from the engine lubrication system, and an indication of low oil pressure may be provided by our system if engine lubricating oil is used in the system.

Proceeding to the operation of the safety control, chamber 57 normally is filled with lubricating oil under substantial pressure. A small portion of this oil leaks through a passage 70 in the rear wall of cylinder 53 and biases an annular pump piston 71 forwardly. The passage 70 is nearly closed by a metering pin 73 fixed to the piston, which closes it entirely except for incidental leakage if piston 71 is moved rearwardly. Piston 71 also is biased forward by two Belleville springs 74. Piston 71 has a cylindrical extension 75 disposed within the annular cylinder 50 and terminating near the rear end of sleeve 45 so that rearward movement of the sleeve due to shaft breakage forcibly drives piston 71 rearwardly. Since the oil cannot escape through the entrance opening 70, it is driven through an outlet 77 which is coupled to the line 26, previously mentioned, extending to the actuator 27. In normal operation of the engine, the amount of oil which flows through the port 70 past metering pin 73 flows continuously through line 26 to the actuator. However, this is entirely insufficient to cause an engine shutdown and merely serves to flush the passages to prevent overheating of the oil system and to provide for indication of low oil pressure.

The actuator 27 (FIGURE 1) includes a body 78 and a cylinder 79 threaded into the body. A piston 81 reciprocable in cylinder 79 is integral with a rod 82 extending both ways from the piston. The left end of the rod is reciprocable in a bore 83 in body 78 and the right end extends from the cylinder 79 and is coupled by a pin 85 to a rocker arm 86 fulcrumed by pin 87 on a bracket extending from the cylinder 79. The left face of piston 81 is exposed to the pressure of oil delivered through pipe 26. The right face of the piston is drained to the engine oil sump through a line 89. Piston 81 is biased toward the position of rest illustrated in FIGURE 1 by a light compression spring 90. The oil leaking through the port 70 biases the piston to the right against the force of spring 90 until a valve defined by the actuator opens. This valve is constituted by a restricted passage 91 in the body and a circumferential groove 93 on the piston rod connected through passages 94 in the piston rod to a drain line 95. When the piston has moved far enough to the right to register groove 93 with passages 91, the leakage oil is discharged to the sump and the piston remains in this position. The drain through passage 91 reduces the oil pressure and, at this point, a flange 97 on the piston rod engages a relatively heavy compression spring 98. This position of piston 81, slightly displaced to the right from that shown in FIGURE 1, is the normal position of the piston during engine operation. The actuating plunger 99 of any suitable snap switch 101 engages the end of the piston rod so that the switch is open in this normal position. However, if oil pressure is lost, spring 90 will push the piston to the left and operate switch 101. This switch is connected between a suitable source of current 102 and a low oil pressure warning light 103.

Proceeding now to the operation of the fuel cut-off valve 21 upon shaft breakage, this valve is shown in FIGURE 1 in its closed position. The valve comprises a body or housing 110 having a bore 111 in which is reciprocably and rotatably mounted a valve spool 113. The spool has lands 114 and 115 which block communication from inlet passages 117 and 118 to outlet passages 119 and 121, respectively, when the spool is in the position shown. A fuel drain passage 122 communicates with an enlarged portion 123 at the end of bore 111. In the position of the valve illustrated, fuel can return from manifold 17 through port 119, notches 125 and 126 in the wall of the bore, and a notch 127 in the valve spool into the enlarged portion 123 and out the drain. The drain from line 121 is obvious. The valve spool is urged to this position by a compression spring 129 engaging a shoulder on the spool and bearing against a head 130 bolted to the body 110. The head 130 includes a cylindrical extension 131 with an inwardly directed flange 132 interrupted by slots 133. A pin 134 extending transversely through the valve spool normally rests against the outer surface of the flange, holding the valve spool so that necks 135 and 137 of the spool provide free communication between the fuel inlets 117 and 118 and the outlets 119 and 121. In other words, the fuel valve is normally held open by engagement of pin 134 with the flange on extension 131. In the normal operating position of the valve, a land 138 closes the bore 111 between passages 118 nad 121 and the drain 122. Also, land 115 blocks communication between the two fuel supply passages. Upon rotation of the valve spool to align the pin with the slots 133, spring 129 moves the valve to the shutdown and manifold drain position illustrated.

An operating arm 141 is splined to the end of the valve spool and retained by nut 142. This arm is coupled by a suitable mechanical linkage, indicated by the broken line 143, to the lever 86 of the actuator. This connection may be by any suitable pull or push link or cable. The end of the link 143 is coupled by pin 145 to the lever 86. This pin rides in an elongated slot 147 so that the normal initial movement of piston 81 in response to normal lubricating oil pressure does not affect the shut-off valve 21. However, extreme travel of the piston 81 due to a shaft break pulls or pushes on arm 141, rotating the valve spool and allowing spring 129 to close the valve. The valve remains closed until manually reset after attention to the engine.

It is highly desirable to provide some means to test the operativeness of the safety control by simulating the effect of an engine breakdown. For this purpose, annular piston 150 (FIGURE 2) mounted in the cylinder 50 has an axial flange 151 which normally bears against piston 71 and limits its forward movement. In this normal position, piston 150 bears against the head of cylinder 50. A pressure oil passage 153 in the body 49 connects through a pressure oily supply line 154 (see also FIGURE 1) with any suitable three-way valve 155 external to the engine. This valve may be operated to connect line 154 either to the pressure oil line 29 or to an oil drain or vent line 157. While the valve is illustrated as operated by a manual lever 158, it may be in practice be a remote controlled valve. With the engine in operation, the valve 155 is normally in the position shown so that there is no pressure in cylinder 50. By moving the valve to supply pressure to the cylinder, piston 150 is moved rearwardly, forcing piston 71 rearwardly, displacing oil from the cylinder 53 and thus actuating the shut-off valve. This mechanism may be employed merely to test the shut-off valve or may be employed as the normal means to shut down the engine, in which case the safety control is tested at each engine shutdown.

It will be apparent from the foregoing that the safety control system of the invention is advantageous in eliminating mechanical actuating linkages within the hot parts of the engine, in the additional provision of checking means for the control, and in the provision of an oil pressure warning light as part of the safety shutdown control. Such a control is most desirable as a means to prevent possible total destruction of a gas turbine engine resulting from a failure of a shaft which would be only a relatively minor casualty if destructive overspeed of the engine is prevented.

The detailed description of the preferred embodiment of the invention to explain the principles thereof is not to be regarded as limiting the invention. Many modifications of structure can be made by the exercise of skill in the art within the scope of the invention.

We claim:

1. A safety control system for an engine having a part displaced in response to a malfunction of the engine, the safety control comprising a pump actuated by said part having a chamber contracted by said displacement, a source of liquid under pressure, a first orifice connecting the source to the pump chamber, a hydraulic motor supplied from the pump including resilient biasing means, a second orifice opened by movement of the said motor against said biasing means providing an outlet orifice from the motor so that normal supply of liquid from the source to the pump operates the motor to a first extent to open the motor orifice and provide circulation of oil through the pump and motor and increased liquid flow due to actuation of the pump operates the motor to a greater extent; and engine shutdown means made effective by operation of the motor to the said greater extent.

2. A safety control system for an engine having a part displaced in response to a malfunction of the engine, the safety control comprising a pump actuated by said part having a chamber contracted by said displacement, a source of liquid under pressure, a first orifice connecting the source to the pump chamber, a hydraulic motor supplied from the pump including resilient biasing means, a second orifice opened by movement of the said motor against said biasing means providing an outlet from the motor so that normal supply of liquid from the source to the pump operates the motor to a first extent and increased liquid flow due to actuation of the pump operates the motor to a greater extent; engine shutdown means made effective by operation of the motor to the said greater extent; and remote-controllable testing means operable to actuate the pump so as to simulate actuation theerof by a said casualty.

3. A safety control system for an engine having a part displaced in response to a malfunction of the engine, the safety control comprising a pump actuated by said part having a chamber contracted by said displacement, a source of liquid under pressure, a first orifice connecting the source to the pump chamber, a hydraulic motor supplied from the pump including resilient biasing means, a second orifice opened by movement of the said motor against said biasing means providing an outlet from the motor so that normal supply of liquid from the source to the pump operates the motor to a first extent and increased liquid flow due to actuation of the pump operates the motor to a greater extent; a signal controlled in response to operation of the motor to the first extent; and engine shutdown means made effective by operation of the motor to the said greater extent.

4. A safety control system for an engine having a part displaced in response to a malfunction of the engine, the safety control comprising a pump actuated by said part having a chamber contracted by said displacement, a source of liquid under pressure, a first orifice connecting the source to the pump chamber, a hydraulic motor supplied from the pump including resilient biasing means, a second orifice opened by movement of the said motor against said biasing means providing an outlet from the motor so that normal supply of liquid from the source to the pump operates the motor to a first extent and increased liquid flow due to actuation of the pump operates the motor to a greater extent; a signal controlled in response to operation of the motor to the first extent; engine shutdown means made effective by operation of the motor to the said greater extent; and remote-controllable testing means operable to actuate the pump so as to simulate actuation thereof by a said casualty.

5. A safety control for an engine including a prime mover, shutdown means adapted to terminate the operation of the prime mover, and responsive means coupled to the prime mover and moved forcibly by a malfunction of the engine; the control comprising, in combination, an expansible-chamber device including a movable part, means biasing the said part to increase the displacement of the device, means operable by said movement of the responsive means to displace the movable part to reduce the displacement of the device, a source of fluid under pressure, means including a restriction connecting the source to the chamber of the device so as to tend to increase the displacement thereof, a pressure-responsive actuator connected for fluid flow thereto from the chamber of the device, the actuator including a restricted vent orifice therefrom and valve means opening a passage to the said orifice upon response of the actuator to a predetermined pressure; and means operated by response of the actuator to a substantially higher pressure to operate the shutdown means.

6. A safety control for an engine including a prime mover, shutdown means adapted to terminate the operation of the prime mover, and responsive means coupled to the prime mover and moved forcibly by a malfunction of the engine; the control comprising, in combination, an expansible-chamber device including a movable part, means biasing the said part to increase the displacement of the device, means operable by said movement of the responsive means to displace the movable part to reduce the displacement of the device, a source of fluid under pressure, means including a restriction connecting the source to the chamber of the device so as to tend to increase the displacement thereof, a pressure-responsive actuator connected for fluid flow thereto from the chamber of the device, the actuator including a restricted vent orifice therefrom and valve means opening a passage to the said orifice upon response of the actuator to a predetermined pressure; means operated by response of the actuator to a substantially higher pressure to operate the shutdown means; and a motor coupled to the expansible-chamber device operable to decrease the displacement of the device for testing the safety control.

7. A safety control for an engine including a prime mover, shutdown means adapted to terminate the operation of the prime mover, and responsive means coupled to the prime mover and moved forcibly by a malfunction of the engine; the control comprising, in combination, an expansible-chamber device including a movable part, means biasing the said part to increase the displacement of the device, means operable by said movement of the responsive means to displace the movable parts to reduce the displacement of the device, a source of engine lubricating oil under pressure, means including a restriction connecting the source to the chamber of the device so as to tend to increase the displacement thereof, a pressure-responsive actuator connected for fluid flow thereto from the chamber of the device, the actuator including a restricted vent orifice therefrom and valve means opening a passage to the said orifice upon response of the actuator to a predetermined pressure; indicator means actuated upon such response to indicate normal pressure of oil from the said source; and means operated by response of the actuator to a substantially higher pressure to operate the shutdown means.

8. A safety control for an engine including a prime mover, shutdown means adapted to terminate the operation of the prime mover, and responsive means coupled to the prime mover and moved forcibly by a malfunction of the engine; the control comprising, in combination, an expansible-chamber device including a movable part, means biasing the said part to increase the displacement of the device, means operable by said movement of the responsive means to displace the movable part to reduce the displacement of the device, a source of engine lubricating oil under pressure, means including a restriction connecting the source to the chamber of the device so as to tend to increase the displacement thereof, a pressure-responsive actuator connected for fluid flow thereto from the chamber of the device, the actuator including a restricted vent orifice therefrom and valve means opening a passage to the said orifice upon response of the actuator to a predetermined pressure; indicator means actuated upon such response to indicate normal pressure of oil from the said source; means operated by response of the actuator to a substantially higher pressure to operate the shutdown means; and a motor coupled to the expansible-chamber device operable to decrease the displacement of the device for testing the safety control.

References Cited in the file of this patent

UNITED STATES PATENTS

| | | |
|---|---|---|
| 2,886,300 | Haworth | May 12, 1959 |
| 2,930,188 | Haworth | Mar. 29, 1960 |
| 2,930,189 | Petrie | Mar. 29, 1960 |
| 3,041,834 | Davies | July 3, 1962 |